(12) United States Patent
Resnick et al.

(10) Patent No.: US 6,185,545 B1
(45) Date of Patent: Feb. 6, 2001

(54) ELECTRONIC PAYMENT SYSTEM UTILIZING INTERMEDIARY ACCOUNT

(75) Inventors: David Resnick; Matt J. Callanan, both of Portland, OR (US)

(73) Assignee: PreNet Corporation, Portland, OR (US)

(*) Notice: Under 35 U.S.C. 154(b), the term of this patent shall be extended for 0 days.

(21) Appl. No.: 09/442,620

(22) Filed: Nov. 17, 1999

Related U.S. Application Data
(60) Provisional application No. 60/108,762, filed on Nov. 17, 1998, and provisional application No. 60/141,994, filed on Jul. 1, 1999.

(51) Int. Cl.⁷ .................................................. G06F 17/60
(52) U.S. Cl. ........................... 705/40; 705/77; 705/44
(58) Field of Search .................................. 705/1, 40, 16, 705/17

(56) References Cited

U.S. PATENT DOCUMENTS

| | | | |
|---|---|---|---|
| 5,068,891 | 11/1991 | Marshall | 379/91 |
| 5,144,649 | 9/1992 | Zicker et al. | 379/59 |
| 5,359,182 | 10/1994 | Schilling | 235/380 |
| 5,440,621 | 8/1995 | Castro | 379/112 |
| 5,465,206 * | 11/1995 | Hilt et al. | 705/40 |
| 5,504,808 | 4/1996 | Hamrick, Jr. | 379/144 |
| 5,511,114 | 4/1996 | Stimson et al. | 379/114 |
| 5,577,109 | 11/1996 | Stimson et al. | 379/112 |
| 5,621,787 | 4/1997 | McKoy et al. | 379/144 |
| 5,640,447 | 6/1997 | Fonseca | 379/114 |
| 5,649,118 * | 7/1997 | Carlisle et al. | 705/41 |
| 5,677,955 * | 10/1997 | Doggett et al. | 705/36 |
| 5,721,768 | 2/1998 | Stimson et al. | 379/114 |
| 5,778,067 * | 7/1998 | Jones et al. | 705/65 |
| 5,794,221 * | 8/1998 | Egendorf | 705/40 |
| 5,864,830 * | 1/1999 | Armetta et al. | 705/41 |
| 5,869,826 * | 2/1999 | Eleftheriou | 235/380 |
| 5,899,980 * | 5/1999 | Wilf et al. | 705/26 |
| 5,907,832 * | 5/1999 | Pieterse et al. | 705/39 |
| 5,913,203 | 6/1999 | Wong et al. | 705/39 |
| 5,914,471 * | 6/1999 | Van De Pavert | 235/380 |
| 5,926,796 | 7/1999 | Walker et al. | 705/16 |
| 5,946,669 * | 8/1999 | Polk | 705/40 |
| 5,949,880 * | 9/1999 | Curry et al. | 705/44 |
| 5,963,924 * | 10/1999 | Williams et al. | 705/40 |
| 5,974,146 * | 10/1999 | Randle et al. | 705/77 |
| 5,991,381 * | 11/1999 | Bouanaka et al. | 379/115 |
| 6,012,048 * | 1/2000 | Gustin et al. | 705/39 |
| 6,014,636 * | 1/2000 | Reeder | 705/17 |
| 6,047,267 * | 4/2000 | Owens et al. | 705/34 |
| 6,047,270 * | 4/2000 | Joao et al. | 705/44 |

FOREIGN PATENT DOCUMENTS 0 950 968 A1 * 8/1997 (EP) .

OTHER PUBLICATIONS

Rouland, Renee C., "The Talk of the Towns", Discount Merchandiser, V36, No 3, Mar. 1996, pp. 26–30.*

Worhington, Steve, "The Cashless Society", International Journal of Retail & Distribution Management, V23, No.7, 1995, pp. 31–40.*

Hutton, David, "Attack of the Smart Cards", Bank Marketing, V 30, No. 2, Feb. 1998, pp. 40–46.*

Hester et al, "Industry Corner: Smart Cards for an Information–Hungry World", Business Economics, V 33, No. 1, Jan. 1998, pp. 54–58.*

(List continued on next page.)

*Primary Examiner*—James P. Trammell
*Assistant Examiner*—Richard W. Hess
(74) *Attorney, Agent, or Firm*—Stoel Rives LLP

(57) ABSTRACT

Payments in cash are submitted to a merchant at a point of sale. The payment transaction is effected electronically to credit the end user's intermediary account. Subsequent electronic communications between the intermediary account and a vendor site effect payment to the vendor for goods or services on behalf of the end user. This system leverages the existing credit card payment system in reverse so as to provide the convenience of submitting cash payments at a multitude of merchant locations.

33 Claims, 9 Drawing Sheets

OTHER PUBLICATIONS

Hisey, Pete, "Looking for the Pot of Gold", Credit Card Management, V 10, No. 4, Jul. 1997, pp. 50–58.*

Allen, Catherine, "Get Smart (Smart Cards and the Virtual Bank)", Bank Management, V 71, No. 2, Mar. 13, 195, p. 58(5).*

Internet: eBANX: www.ebanx.com/how_it_works.html.

International Search Report dated May 25, 2000, from the International Searching Authority for corresponding PCT Application No. PCT/US99/27407.

* cited by examiner

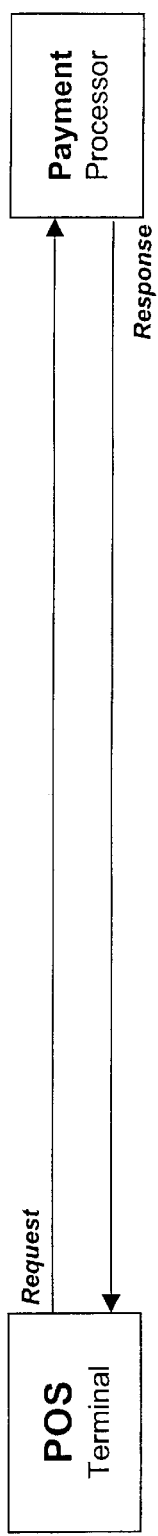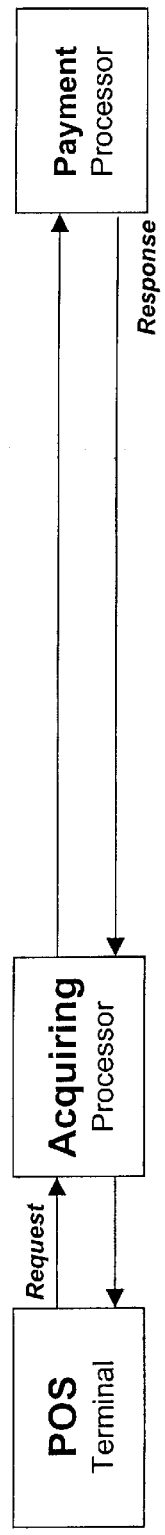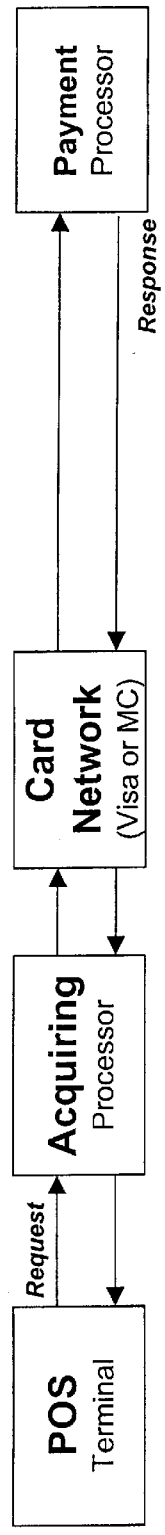

ELECTRONIC PAYMENT SYSTEM UTILIZING INTERMEDIARY ACCOUNT

RELATED APPLICATION DATA

This application is a continuation of U.S. Provisional Application No. 60/108,762 filed Nov. 17, 1998 and is a continuation of U.S. Provisional Application No. 60/141,994 filed Jul. 1, 1999; both prior applications are hereby incorporated by reference. Applicant claims, as to both prior applications, the right of priority pursuant to the Paris Convention and 35 USC § 119.

TECHNICAL FIELD

The present invention relates to methods and apparatus for making payments for the purchase of goods or services. Specifically, the invention provides for receiving payments in cash or by other means, at any of a number of convenient locations, such as merchant point-of-sale locations, and includes means for electronically crediting a selected end-user account in response to the payment. An intermediate account is provided in between the payment side and the vendor account side, offering advantages in terms of performance, accounting, credit risk allocation, convenience and user anonymity.

BACKGROUND OF THE INVENTION

Various means are known for paying for goods or services, the most fundamental method being payment in cash at the time and place of the purchase. Credit cards and debit cards are widely used for convenience in making purchases as the user need not carry cash and risk losing it or having it stolen. Credit card accounts also are used to extend credit to a user or cardholder, although card issuers are known to suffer substantial credit losses. One way for vendors of goods or services to avoid credit losses and reduce collection problems is to establish "pre-paid" accounts. A pre-paid account, as the name implies, requires that the user pay for selected goods or services in advance; subsequent delivery of the goods or services is charged against the pre-paid account by debiting the user's balance. The problem here is that adding value to or "recharging" pre-paid vendor accounts is not convenient.

Pre-paid wireless (cell phone) service provides an illustrative example. Pre-paid wireless service enables customers to utilize the convenience of cellular and digital communications by establishing a prepaid account with a wireless telecommunications vendor. Typically, prepaid wireless cards, each card corresponding to a wireless services account, are purchased in preset denominations in a limited number of locations. The cards are issued in fixed value increments, for example, $20, $50 or $100. Each card provides the end-user with a specified amount of wireless calling dollars or minutes. After the initial allocation is exhausted (or before), the user can "recharge" or reload their wireless account usually by calling an 800 number, having a credit card handy, and either talking with a customer service representative (CSR) or using an automated system to charge additional minutes to the credit card. This system is burdensome to both the user and the wireless carrier. Moreover, some users have pre-paid wireless accounts because of credit problems and thus may not have a valid credit card available for this purpose.

A new method for affecting payment for wireless telecommunications services, as well as other goods and services, is needed that enables a customer to purchase variable amounts of value for loading onto the customer's account. A new system should allow making such payments at convenient locations. And a new payment system should allow a user to affect bill payment or otherwise purchase goods and services, for example from a remote vendor, without the need to establish good credit in advance. It is also desirable that a payment system provide anonymity especially for dealing with remote vendors, yet physical separation of purchaser and vendor, the "card holder not present" scenario, is known to contribute to credit card fraud losses. The use of cash addresses some of these problems, but it is not practical for remote vendors.

SUMMARY OF THE INVENTION

A primary aspect of the present invention is directed to providing a stored value intermediary account to implement a centralized payment system. The centralized payment system interfaces with merchant points-of-sale where cash payments (or other forms of payments) are received from the end-user (or his agent). The present invention leverages the existing financial network that is used around the world for credit card transactions, but it uses that existing system "backwards" in that payments are received, rather than credit extended, at the merchant point-of-sale. Interfacing to the existing world-wide network, e.g. VisaNet or another card association network, in this new way allows payments to be received at any of literally millions of merchant locations that are coupled to the network, thus providing extraordinary convenience for the end-user. The payments are posted to an intermediary account maintained on the centralized payment system. Thus an important feature of the present invention is the use of a ubiquitous standards-based electronic system for recharging (adding value to) end-user accounts from retail point-of-sale terminals.

Another aspect of the invention focuses on the payment side of the system; namely, effecting an electronic payment from the central intermediary account to a wireless carrier or other vendor on behalf of the end-user. A further advantage in this regard is security and anonymity because no personal information about the end-user, not even the user's name, need be stored in the central intermediary payment system.

Additional objects and advantages of this invention will be apparent from the following detailed description of preferred embodiments thereof which proceeds with reference to the accompanying drawings. In the detailed description, we use wireless services as an example of goods or services that can be paid for using the new centralized payment system. Wireless services are merely illustrative and are used as a convenient way to describe the invention; it can be used to pay for any goods or services.

BRIEF DESCRIPTION OF THE DRAWINGS

The foregoing aspects and the attendant advantages of this invention will become more readily appreciated through reference to the following detailed description, when read and considered in conjunction with the accompanying drawings, wherein:

FIG. 9 is a series of flow charts illustrating a method for communicating the recharge and authorization request to the the intermediary payment processor.

DETAILED DESCRIPTION OF A PREFERRED EMBODIMENT

Figure 1:
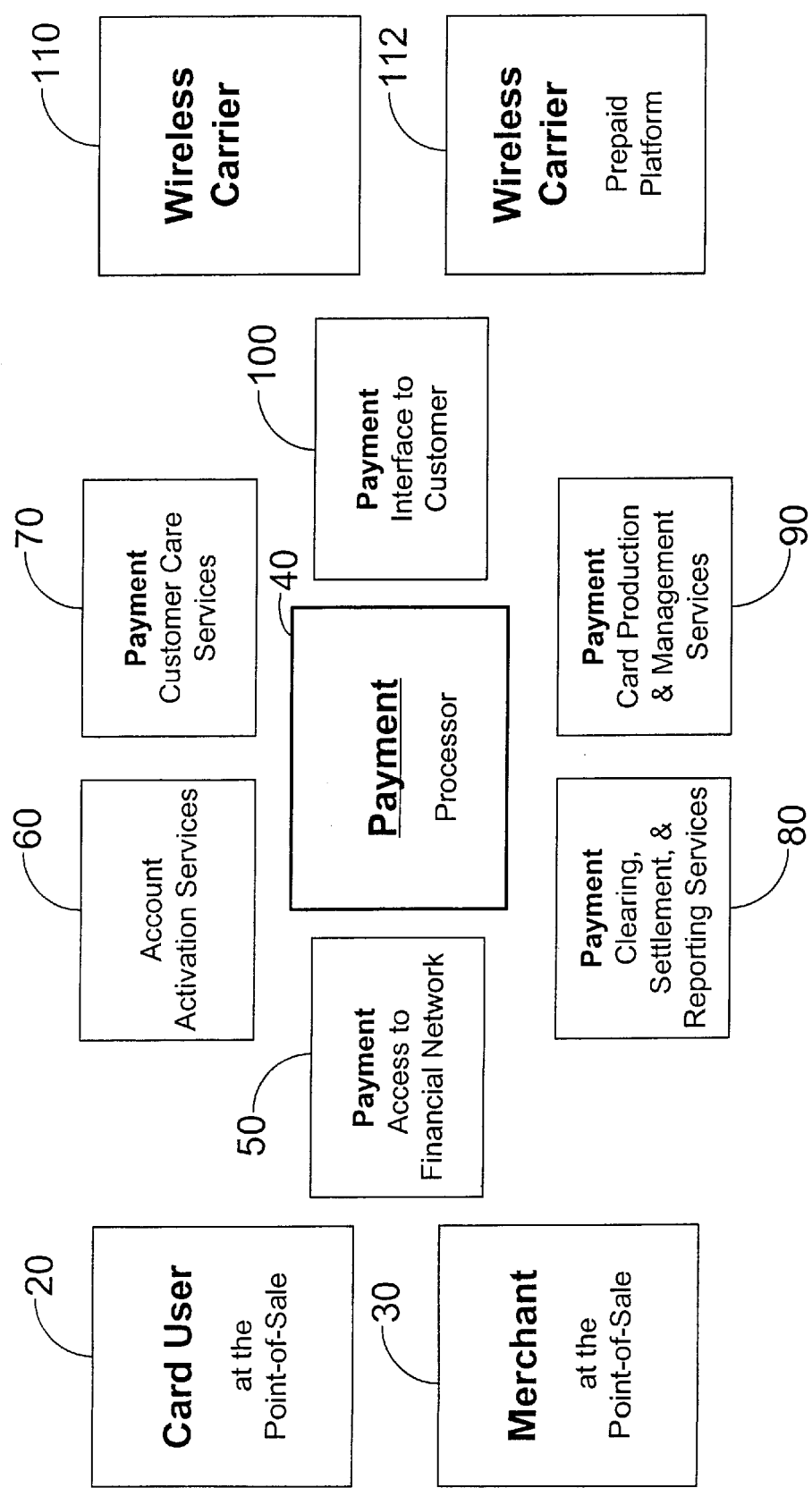
FIG. 1 is a block diagram introducing the various components involved in the system and methods of the present invention.

FIG. 1 illustrates the principle components of a system and methods according to the present invention to provide payment and related functionality for the purchase of wireless telecommunications services and other pre-paid goods and services. Referring to FIG. 1, a card user 20 represents a person who has or will establish one or more payment accounts according the invention. Card user 20 is illustrated as visiting at a point-of-sale. A point-of-sale can be a conventional "brick and mortar" retail merchant location, such as a store or restaurant. A point-of-sale for present purposes can also be an automated teller machine (ATM), a kiosk, touch-screen or other data terminal as further described herein at any location accessible to users.

In FIG. 1, the merchant 30 refers generically to the proprietor of a point-of-sale establishment, such as a convenience store or other merchant location. In general, merchant 30 refers an establishment where one or more point-of-sale terminals are installed so as to provide access to a financial network. For example, millions of retail establishments around the world today have installed small data terminals which are coupled to a financial network for communicating financial transaction information, either using a dial up modem or dedicated line. Typically, these terminals include a card reader that enables a merchant's employee to "swipe" a credit card whereupon the card reader reads the credit card account number for transmission over the financial network as part of a credit (or debit) card purchase transaction. According to the present invention, as further described later, the same type of terminal can be used instead to facilitate a payment transaction in which the cardholder delivers cash or other payment to the merchant at the point-of-sale for the purpose of "recharging" or adding value to an associated user account, for example a wireless carrier prepaid platform 112.

The heart of the present system is a payment processor 40, which can be conveniently implemented on a suitable general purpose digital computer programmed as explained in greater detail later. The principle features and functions of the payment processor, each of which will be described in greater detail in turn, include a means 50 for accessing an existing financial network to communicate financial transaction data; account activation services 60 for activating and maintaining intermediary accounts on the payment processor system; payment customer care services 70; payment clearing, settlement and reporting services 80; payment card production and management services 90 and means 100 for interfacing the payment processor system to a customer such as a wireless carrier prepaid platform 112.

It is critical to note that in this application, the cardholder or card user 20 is an individual (or business) who utilizes goods or services provided by a vendor such as the wireless carrier 110/112. The user account, which we also refer to as the end-user account, is maintained by the vendor such as the wireless carrier 110 on the vendor's prepaid platform 112. The end-user is not referred herein as a "customer." Rather, the "customer" of the present payment system is the provider of goods or services, such as wireless telecommunications services carrier 110, who, again, provides goods or services to the end-user. That vendor is a "customer" of the present payment system. The system is intended to serve the needs of multiple customers (each of which has its own universe of end-users). One important feature of the present system is that the customer interface 100 provides a standardized interface to enable numerous disparate "customers" to take advantage of the present system, providing a highly effective real time cost-efficient method for their end-users to pay for goods and services. The payment processor 40 maintains a database of cardholder accounts, each of which is "associated" with a corresponding "customer" or vendor end-user account, as further explained below.

Figure 2:
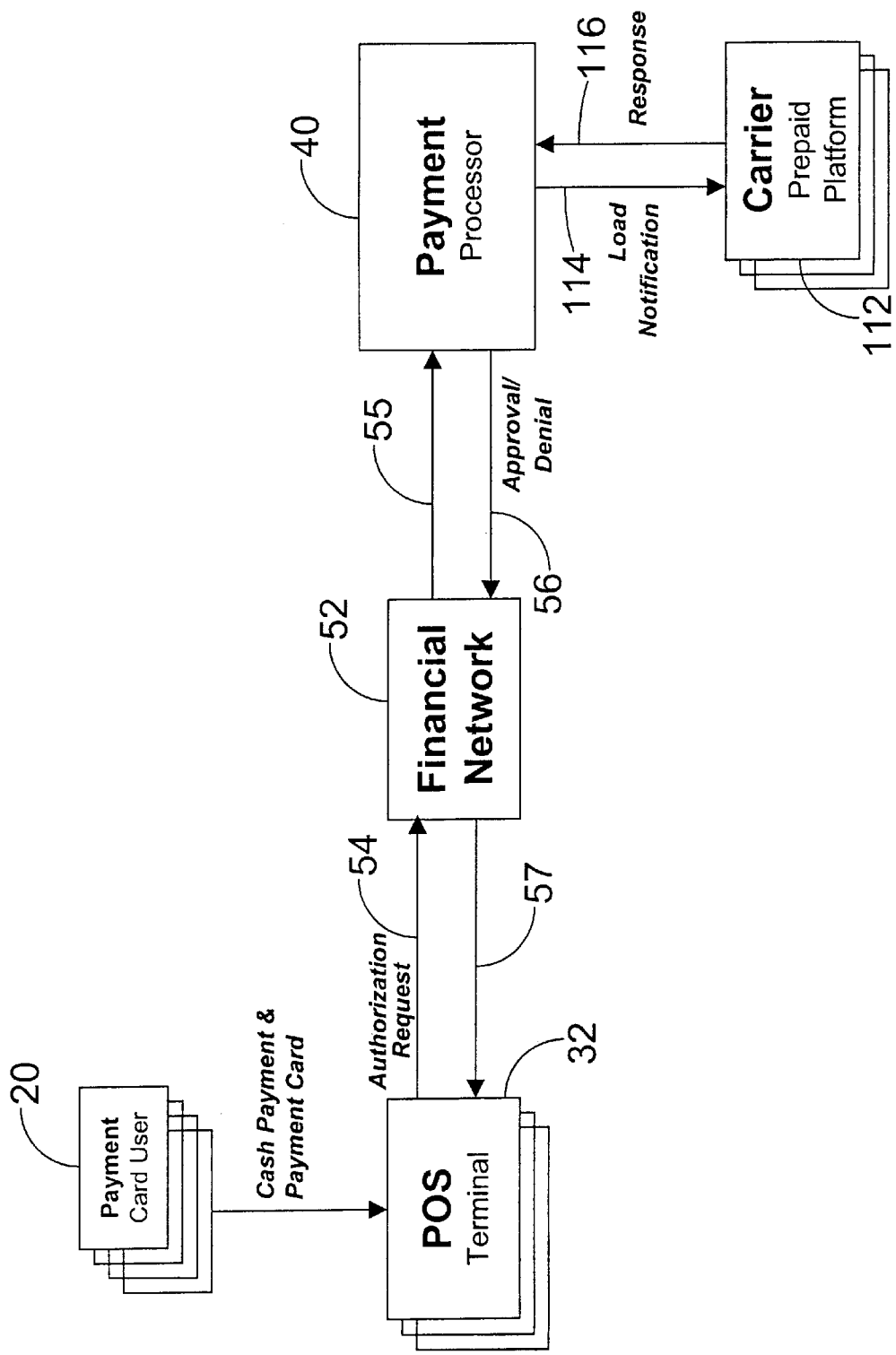
FIG. 2 is a flow chart illustrating a method for processing the recharge of an end-user account maintained on a prepaid platform, utilizing an intermediary payment processor system according to the invention.

FIG. 2 is a flow chart illustrating the basic method for processing a recharge transaction to add value to an end-user account maintained on a prepaid platform. We use prepaid wireless services as an illustrative example of a customer/vendor. The payment card user 20 visits a merchant of point-of-sale location where a point-of-sale terminal 32 is installed. The card user makes a payment to the merchant, for example in cash, and presents the user's account identifier. This refers to the intermediary account which is maintained on the pre-payment processor 40. It is not the same as the end-user account which would be maintained at the carrier's prepaid platform 112. The card user can present the intermediary account number by providing a physical card, in which case the merchant can swipe the card in the typical point-of-sale terminal to read the account number. Alternatively, it can be keyed into the POS terminal manually. The merchant also keys in the dollar amount of the payment and presses a key or a predetermined code to initiate an authorization request.

The payment to the merchant need not necessarily be made in cash. For example, the payment could be made using a credit card or a debit card. In that case, the same POS terminal 32 can be used in the conventional manner to effect the credit or debit card transaction. However the payment might have been received, the merchant then indicates the amount of the payment, as noted, and transmits through the terminal an authorization request 54 into the financial network 52. Financial network 52 corresponds to any of the existing card association networks currently in use, for example the VisaNet network. The POS terminal 32 can be directly connected to the financial network, or a plurality of individual terminals are sometimes congregated through a merchant hub (not shown), which in turn is communicates with the financial network. Various architectures for this connection are known in the prior art. It is also common for one or more point-of-sale terminals to be networked or otherwise coupled to a merchant host computer at the retail location. In addition, it is generally the case that the point-of-sale terminal (or merchant host/hub) communicate with an "acquiring processor" which in turn communicates to the card association network (52 in FIG. 2). The present invention can be used over any of these network arrangements, as illustrated in FIG. 9.

In all cases, the authorization request message is routed to the payment processor 40 by using a bank identification number (BIN) that corresponds to the payment processor 40. The BIN is a 6-digit series of numbers that is used by bank card companies to identify their financial transactions. For example, American Express' (AmEx) range is 3xxxxx; Visa's range is 4xxxxx and MasterCard is 5xxxxx. A range of numbers is assigned to the processor of the present invention so that it appears to the financial services network as if it were a credit card issuer.

Thus every intermediary account identifier maintained by the payment processor 40 includes a BIN for routing communications over the existing financial network to the processor. The processor 40 receives the transaction, processes it, and transmits an approval or denial message 56 via the financial network 52 through connection 57 back to the POS terminal 32. Assuming that the transaction is approved, the POS terminal can print a receipt and optionally print a duplicate—one for the card user and one for the merchant. These types of transactions traverse the existing financial network without difficulty because the card number and the transaction messages (e.g. authorization request/approval/denial) conform to bank card industry standards and protocols. A principle advantage of the present invention is that it leverages the worldwide existing financial network by using it for a new purpose and in a new way. Thus the functionality and features of the invention become available to users worldwide at minimal cost of implementation.

After the payment transaction between the payment processor 40 and the point-of-sale terminal 32 is completed, the processor 40 then provides a load notification signal 114 to the carrier prepaid platform 112. This load notification identifies the end-user account that corresponds to (having been previously associated with) the intermediary account number presented by the card user at the point-of-sale. The load notification message 114 also includes an amount by which the end-user account should be credited or "recharged." This amount is not necessarily the same as the amount of the payment made by the card user to the merchant, depending upon various fees, discounts, or promotional programs that may apply. In the case of telecom services, the credit may be denominated in air minutes rather than dollars. All of these considerations and options can be taken into account through suitable programming in the processor 40. The processor 40 preferably is coupled to the customer site, for example a carrier prepaid platform 112, via a high bandwidth data communications link, such as frame relay connection, to minimize delay. Accordingly, the end-user account is recharged in nearly "real time" after payment at the merchant point-of-sale. Thus, in the case of prepaid wireless services, where the cardholder's wireless account has been exhausted, that account will be "recharged" and telecommunication services available within seconds after payment is tendered to the merchant. The "check in the mail" delay is eliminated.

Figure 3:
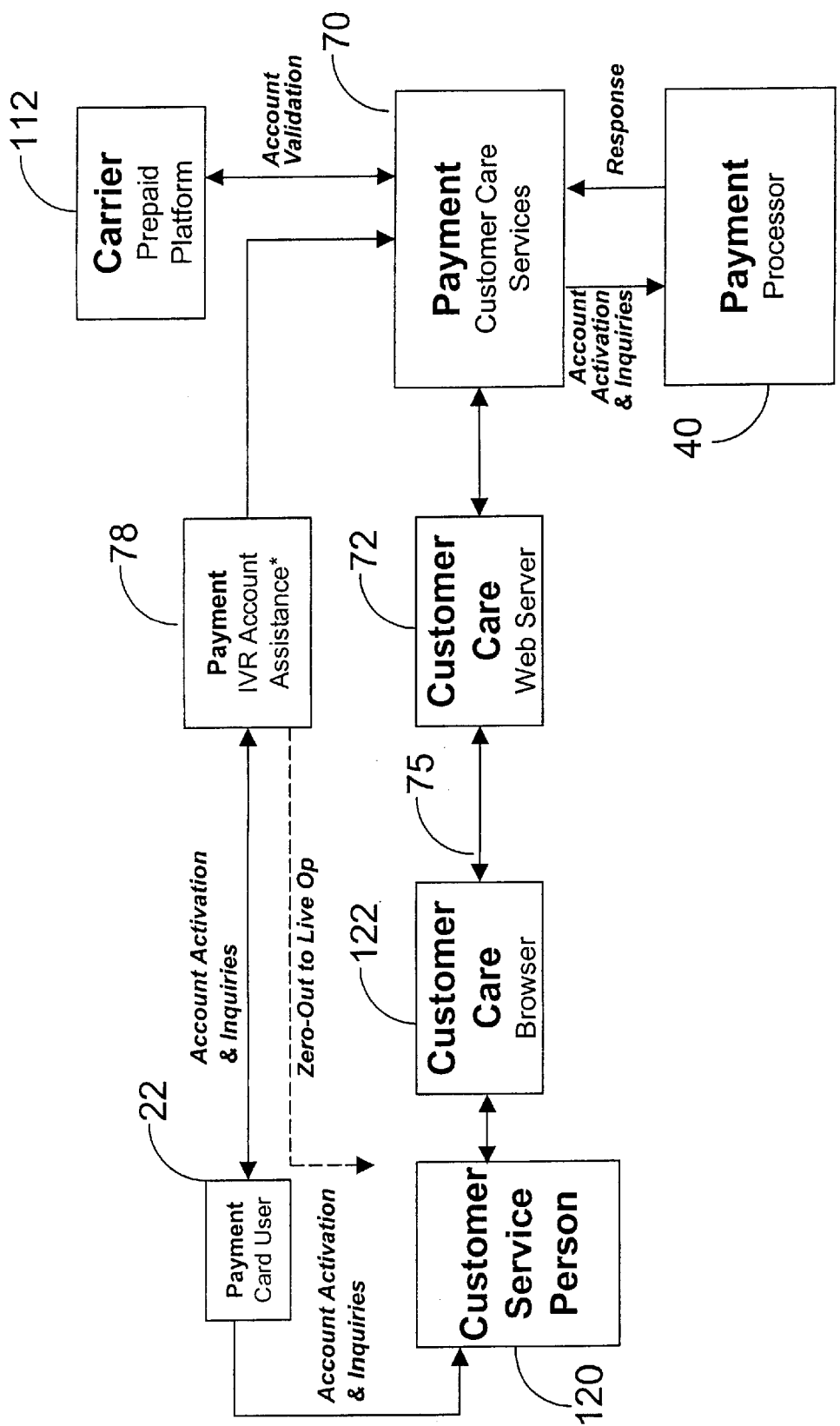
FIG. 3 is a flow chart illustrating a method for establishing account and processing customer inquiries through the intermediary payment processor Customer Care Services.
Figure 8:
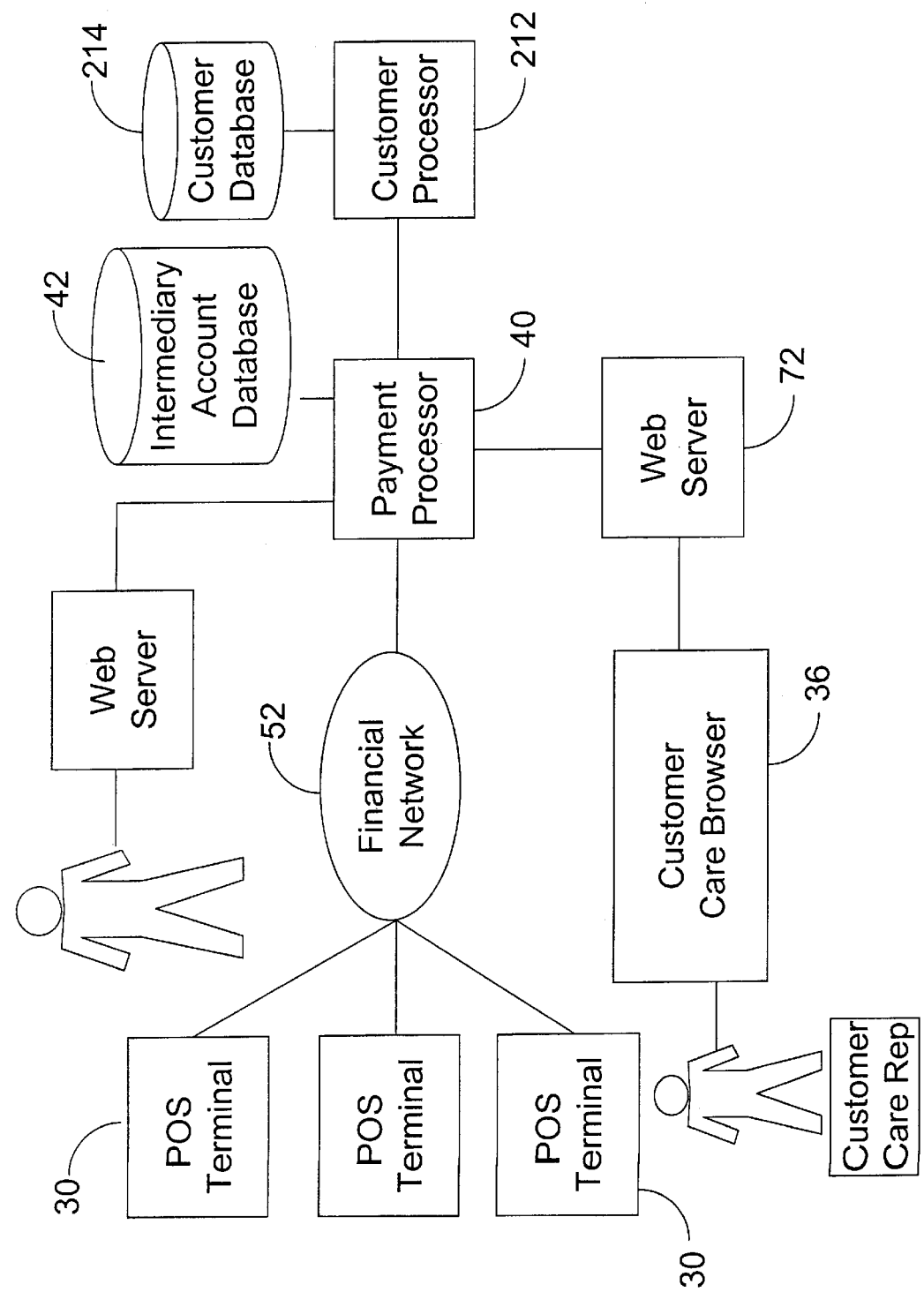
FIG. 8 is a block diagram illustrating the components involved in the communications between a customer, a merchant, the intermediary payment processor and an Internet merchant.

FIG. 3 is a flow chart illustrating methods for establishing an intermediary account and providing certain customer care services. To begin, a payment card user 22 contacts a payment account assistance module 78, which can be implemented as part of customer care services software 70 on the payment processor system 40 or on another platform that can communicate with the processor. The account assistance software can be implemented, for example, using interactive voice recognition (IVR) technology, which is commercially available. This customer service application 78 is accessed by the card user in order to activate his or her account, by associating the intermediary account (card number) with an end-user account that is maintained by a payment customer such as a wireless carrier prepaid platform 112. The card user accesses the customer service application 78 and is prompted to identify the customer (carrier) and/or the end-user account number. (The user account number often can be used to identify the carrier.) The customer service application 70 communicates with the prepaid platform 112 to confirm or validate the account number provided by the card user. Assuming that the account information is valid, the customer care services 70 then initiates account activation on the processor 40. Specifically, an account activation operation has the effect of associating the card number (the intermediary account identifier) with a selected prepaid platform (or other vendor) end-user account number. This association is reflected in an intermediary account database 42 maintained by the payment processor 40 as illustrated in FIG. 8. There is no necessity for the processor database to contain any personal information about the card user; it need not even include the card user's name. However, steps can be taken to provide security in order to prevent, for example, an unauthorized person from changing the association of an intermediary account from one vendor to another.

If the card user experiences difficulty in using the account assistance module 78 or simply prefers to talk with a live operator, they have the option to press zero, for example, to connect to a live operator 120. Alternatively, card user 22 can directly contact the a customer service representative 120 at any time they wish to do so. In FIG. 3, the CSR 120 is a customer service representative of the vendor, for example the wireless services carrier (110 in FIG. 1) that is affiliated with the prepaid platform 112. The payment system customer care services 70 provides support to the carrier CSR 120 so that a customer service representative can conduct account activation and inquiries to the processor database. Preferably, the customer care services are provided through a customer care web server interface 72. The web server is non public. Rather, it is dedicated to providing a convenient interface to the carrier CSR through a customer care browser 122 executing on the carrier CSR's computer. The carrier (or other customer CSR) has only limited access and privileges on the processor system 40, as necessary to provide customer service to card users. For example, the carrier CSR would not be able to effect the equivalent of a payment transaction as that can be done only by a merchant as described above.

Figure 4:
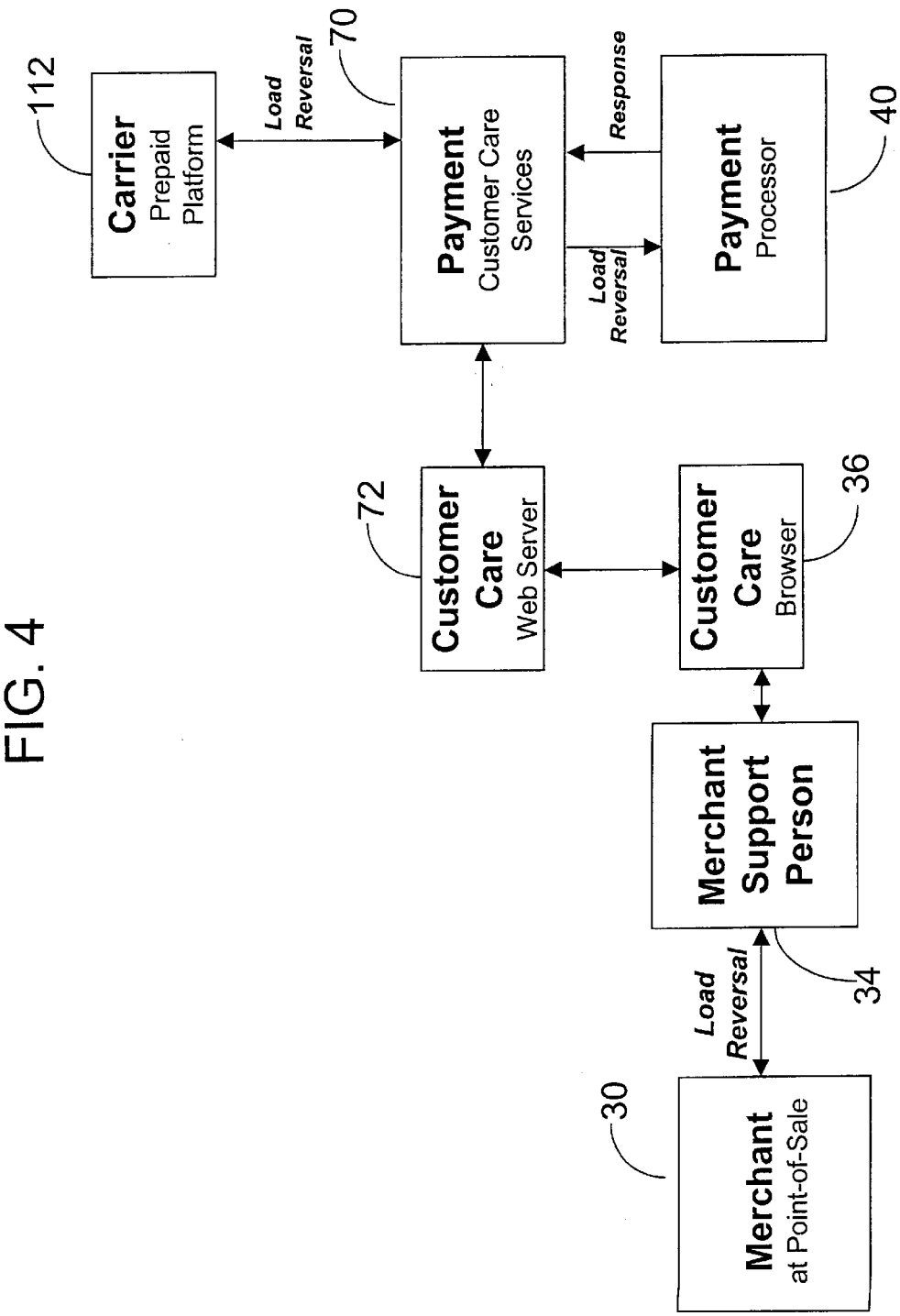
FIG. 4 is a flow chart illustrating a method for reversing unauthorized or improperly processed transactions.

FIG. 4 illustrates additional features of the payment customer care services application 70. Here, the customer care services include providing support to a merchant support operator 34. The point-of-sale merchant 30 contacts a merchant support operator 34 in the event that a load reversal transaction becomes necessary, for example, where a payment transaction was effected an error. The customer care services application 70 provides an interactive interface to the processor 40, which can be accessed by the merchant support operator 34. In a presently preferred embodiment, the customer care services includes a customer care web server application 72 so that the merchant support operator can conveniently access the processor through a customer care browser interface 36, such as a commercially available web browser operable on a personal computer. This way no special equipment is needed to provide quality support to participating merchants.

Customer Interface

Referring once again to FIG. 1, it shows a customer interface 100 for interfacing the processor to the customer platform. The reader is reminded that, throughout this document, "customer" refers to the payment processing systems customer, whereas "end-user" refers to the cardholder, which is to say the person that uses goods or services sold by the "customer." At least three transaction types are supported by the payment system customer interface: Account loading (charge/recharge), Account validation, and Load reversal.

Below is a description of each of the three transaction types and the payment processing that is associated with them.

1. Account loading. Account loading (aka account recharge) is a transaction which uses the payment card to add value to the end-user's account as it is stored at the customer database. Upon receipt of an account loading transaction, the payment system performs a series of verifications to determine if the transaction is valid. These verifications can include, for example, authentication of the payment account, assessing transactional velocity and limits, validation of merchant, and detection of duplicate transactions.

If the transaction passes the validation checks then the payment processor and prepares the transaction for remote processing at the customer processor. The payment system identifies the customer, the customer platform, and the end-user account number based on the payment account number.

2. Account validation. Account validation is a transaction to verify that an end-user account number (e.g. a cell phone number) exists in the customer database. This transaction is performed when the end-user account number is being associated with the payment system (intermediary) account number. This transaction can be managed by either an interactive voice response (IVR) application that is running on a voice response unit (VRU) or through a live customer care representative accessing the PreCash processor through a web browser and a web server, as described above with reference to FIG. 3. Typically this transaction will occur only once per payment card (account) and only once per end-user.

3. Load reversal. Load reversal is a transaction to reverse the effects of a previously processed account loading transaction. This transaction is not designed to merely remove value from the balance associated with the end-user's account but to do so only to turn back the effects of an identified loading transaction that was previously processed against that account. Other requirements of this transaction type include that the load reversal must occur on the same day as the original account load transaction and the end-user account must have enough of a balance that the reversal amount can be subtracted from it. This transaction will be managed by a live customer care representative accessing the payment processor through a web browser and a web server, as described briefly above with reference to FIG. 4. This transaction is intended to provide merchants with the ability to reverse an erroneous transaction rather than to provide a refund to an unsatisfied end-user.

Communications

Referring again to FIG. 2, the connection between the payment system (processor 40) and the customer can be a Frame Relay network 114 or some other secure link, 116 in a presently preferred embodiment, although various communications hardware and protocols can be used. The communications protocol over which the transaction message will be transmitted from the payment system to the customer can be, for example, TCP/IP. The customer may implement any mechanism qualified to receive and respond to a TCP/IP message including a TCP/IP server side socket.

Processing the Transaction at the Customer Processor

Each transaction type is processed in a different way by the customer processor. Once the transaction type is identified, the processing that is likely to occur at the customer processor is described below.

1. Account Loading. Lookup the cardholder's account based on the customer account number. Perform validation checks. Add the payment amount to the account balance. Log the transaction. Respond to payment processor.

2. Account Validation. Lookup the cardholder's account based on the customer account number. Log the transaction. Respond to the payment processor.

3. Load Reversal. Lookup the cardholder's account based on the customer account number. Perform validation checks. This will include the verification that the cardholder's account balance is at least the value to be subtracted from the balance. Subtract the amount of the previously processed transaction from the account balance. Log the transaction. Respond to the payment processor.

Batch Processing

The payment system can be programmed to support batch processing. In a batch processing system, the customer will have available only a subset of the functionality that was described above. The following limitations can be expected in a batch environment:

1. Delayed load transactions. As is the asynchronous nature of batch processing, any updates to the end-user account balance will experience a delay.

2. No account validation. The effectiveness of the account validation transaction type is eliminated in a batch processing environment. Therefore, this transaction type will be unavailable.

3. Limited load reversal transactions. It is a requirement of the load reversal transaction type that the end-user have an account balance of at least the amount to be reversed. This cannot be verified in a batch environment.

Nonetheless, many of the essential advantages of the present invention can still be achieved with a batch processing arrangement.

Settlement and Clearing

Figure 5:
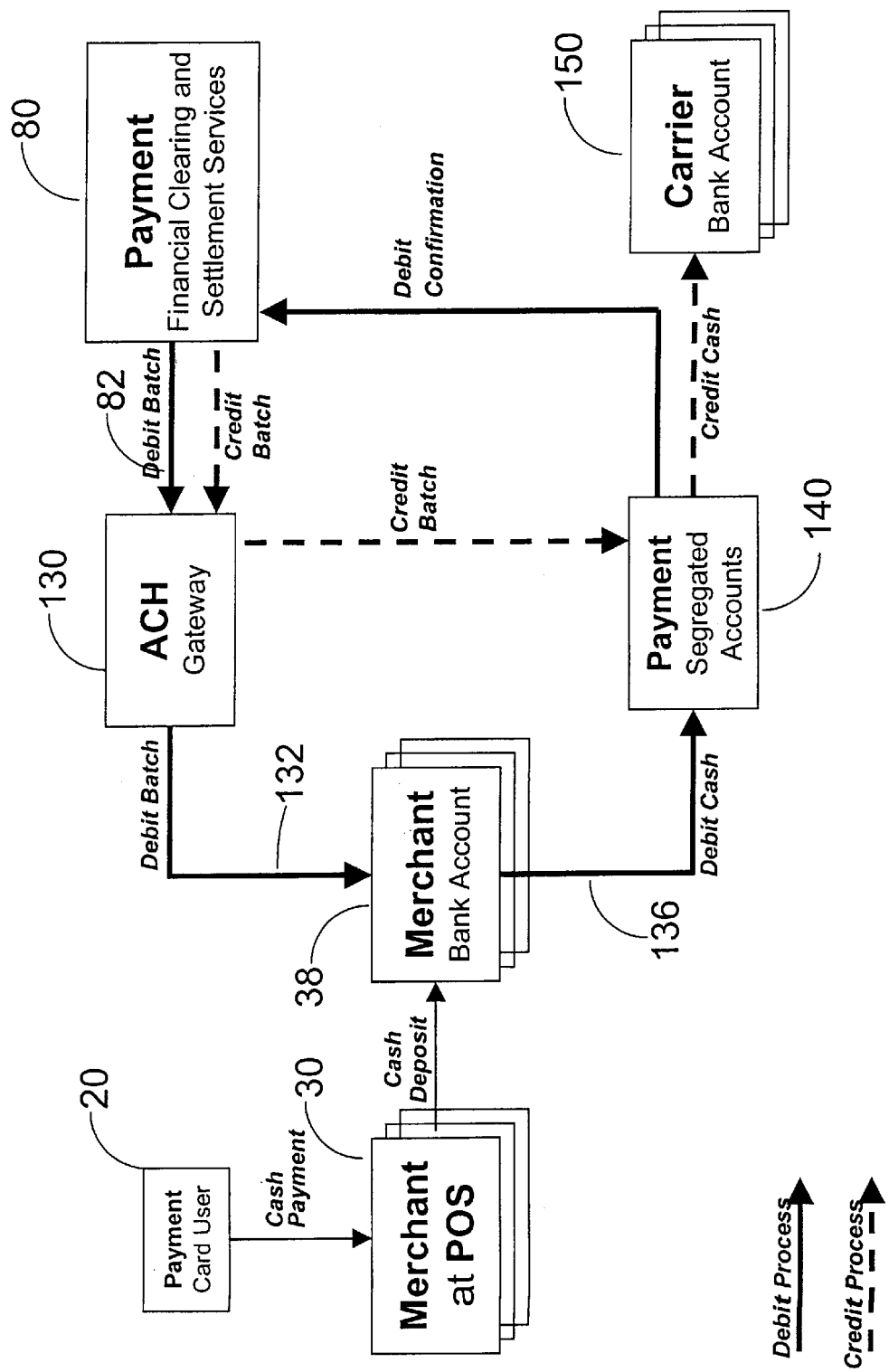
FIG. 5 is a flow chart illustrating a method for the financial settlement and clearing of payments made by the the intermediary payment processor card user for wireless telecommunications services.

FIG. 5 illustrates clearing and settlement processing according to the present invention. As described earlier, a card user 20 makes a cash payment to a merchant 30 at a point-of-sale, and the merchant subsequently deposits the cash into the merchant's bank account 38. The payment transaction is logged in the payment processor 40 database (not shown). At the end of the processing day, the processor aggregates all of the loading (payment) transactions for the day based on merchant and batches them into a file. This function is carried out by the payment financial clearing and settlement services application 80, which may be implemented in software as a part of the processor system. This debit batch file 82 is submitted to the automated clearing house (ACH) Gateway 130 for processing. The ACH Gateway 130 in turns transmit this information to the federal reserve which in turn debits funds from the merchant's bank account 38 and in turn credits the funds to the pre-payment processor's bank account 140. Thus, the payment processor system performs various accounting functions and provide a clearing data that enables the settlement process to occur via the electronic transfer of funds from merchant bank accounts to the pre-payment processor bank accounts. Once the payment processor reconciles these transfers with transaction activities records to ensure that accurate funds were secured, funds are then forwarded onto the bank accounts of the corresponding customers. Several days may elapse between transaction activity and the actual transfer of funds into the customer's bank account, in which time the processing and reconciliation will occur. Periodic statements summarizing daily activity and associating that activity with subsequent fund transfers can be prepared by the processor and provided to the customers and merchants.

Reporting Functions

Figure 6:
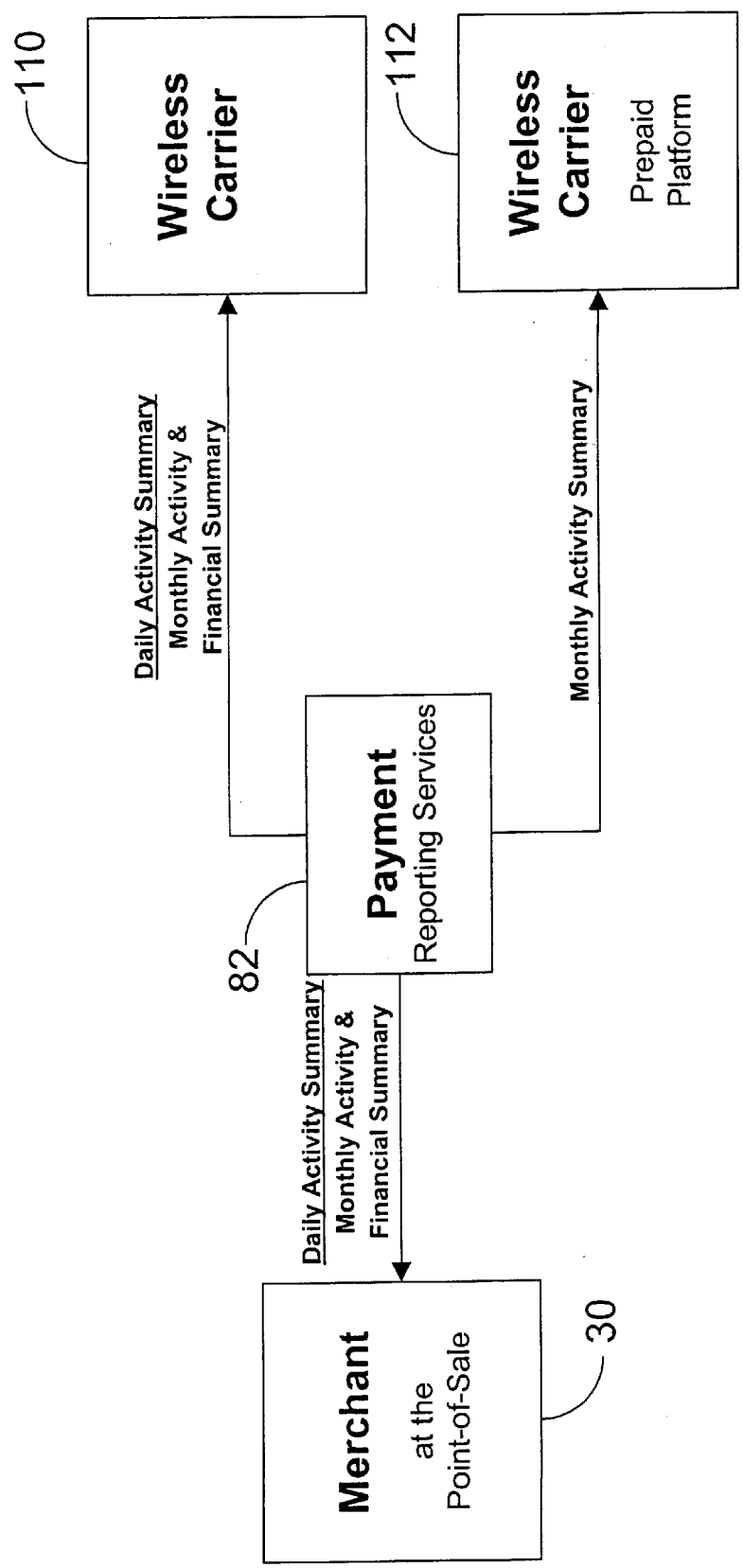
FIG. 6 is a flow chart illustrating a method for reporting the daily and monthly activity of the end-user, the merchant and the wireless carrier.

FIG. 6 illustrates these reporting activities and a presently preferred embodiment. Referring to FIG. 6, the payment reporting services 82 provide a daily activity summary to the POS merchant 30, and can also provide periodic, for example monthly, activity and financial summary information. Second, a payment reporting services provide daily activities summaries to its customer, for example the Wireless Carrier 110, and can also provide periodic activity and financial summaries. Finally, as illustrated in FIG. 6, reporting services 82 can provide periodic activity summaries to the wireless carriers prepaid platform vendor 112.

Card Production and Management Services

Figure 7:
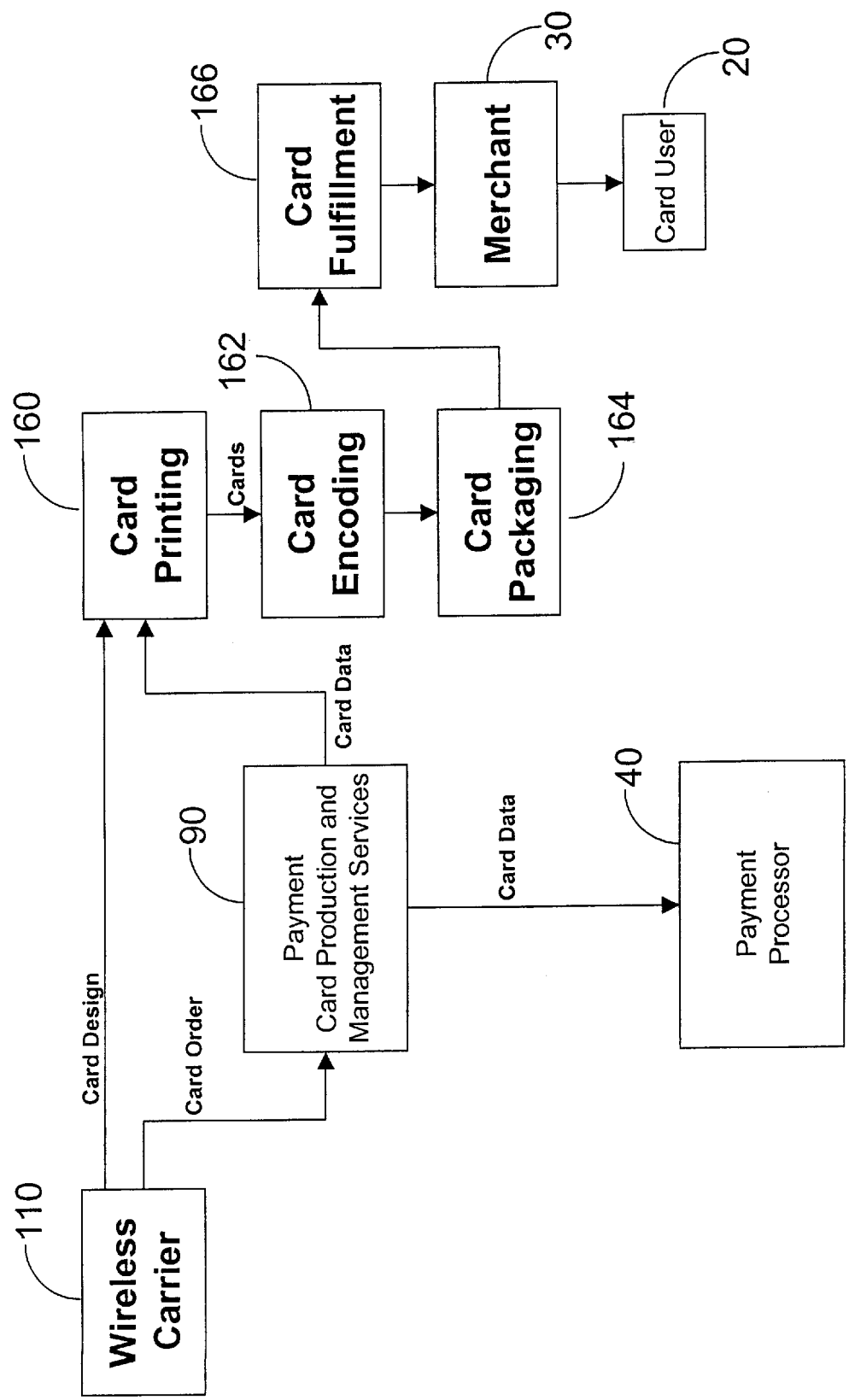
FIG. 7 is a flow chart illustrating a method for the ordering, production and distribution of the the intermediary payment processor card.

FIG. 7 illustrates the card production and management services.

It will be obvious to those having skill in the art that many changes may be made to the details of the above-described embodiment of this invention without departing from the underlying principles thereof. The scope of the present invention should, therefore, be determined only by the following claims.

We claim:

1. A method for effecting payment for goods or services comprising:

providing a centralized payment processor;

establishing an intermediary account on the payment processor having a corresponding account identifier;

associating the intermediary account with an end-user's account maintained by a vendor;

conducting a payment transaction comprising receiving a payment from the end-user at a point-of-sale together with the account identifier;

communicating data indicative of the payment transaction from the point-of-sale to the centralized payment processor;

in the payment processor, validating the payment transaction data and transmitting a response to the point-of-sale, said response including an indication of approval if the validating step results in approval of the transaction;

in the payment processor, if the validating step results in approval of the transaction, interfacing with the vendor so as to load value into the end-user's associated account responsive to the payment transaction;

establishing an intermediary bank account at a financial institution for deposit of funds corresponding to the intermediary account established on the payment processor; and collecting an amount of money equal to the payment amount, subject to adjustment, from the point-of-sale proprietor into the intermediary bank account by electronic funds transfer.

2. A method according to claim 1 wherein the payment is in the form of cash.

3. A method according to claim 1 wherein the payment is made as a debit card transaction.

4. A method according to claim 1 wherein the payment is made as a credit card transaction effected via communication with a computer.

5. A method according to claim 1 wherein the point-of-sale is a brick and mortar retail merchant site.

6. A method according to claim 1 wherein the point-of-sale is a vending machine.

7. A method according to claim 1 wherein the point-of-sale is an automated teller machine (ATM).

8. A method according to claim 1 wherein the end-user account is a prepaid long-distance telephone service account.

9. A method according to claim 1 wherein the end-user account is a prepaid wireless telephone service account.

10. A method according to claim 1 wherein said communicating data indicative of the payment transaction from the point-of-sale to the central payment processor includes communicating the data from the point-of-sale via a card association network to the payment processor.

11. A method according to claim 10 wherein the communicating step includes forwarding the data through an acquiring processor.

12. A method according to claim 10 wherein said communicating data from the point-of-sale to the payment processor comprises communicating an authorization request indicating the amount of the payment.

13. A method according to claim 12 further comprising providing a data terminal at the POS for communicating transaction data to the payment processor; the data terminal including means for communicating data over a telephone line.

14. A method according to claim 13 and further comprising printing a receipt at the point-of-sale that indicates the intermediary account number and the payment amount.

15. A method according to claim 1 wherein the intermediary account is represented by a physical token that displays the corresponding intermediary account identifier.

16. A method according to claim 15 wherein the token has a machine-readable feature to enable automatic reading of the intermediary account identifier.

17. A method according to claim 16 wherein the token comprises a card having a magnetic stripe that stores machine-readable data indicating at least the intermediary account identifier.

18. A method according to claim 17 wherein the card complies with financial industry standard ANSI/ISO 7811.

19. A method according to claim 1 wherein the intermediary account identifier includes a BIN number within a predetermined range so as to identify the account as an intermediary account to support transaction message routing over the financial network.

20. A method according to claim 1 wherein said communicating data indicative of the transaction from the point-of-sale to the centralized payment processor comprises:

communicating a transaction message indicating the amount of the payment from the point-of-sale to the POS merchant's acquiring processor;

routing the transaction message from the acquiring processor into a financial network;

providing a network access point for the payment processor; and routing the transaction message via the network access point to the payment processor.

21. A method according to claim 20 wherein the financial network is a credit card association network.

22. A method according to claim 1 wherein establishing the intermediary account includes producing a plurality of cards, each card corresponding to a respective intermediary account on the processor.

23. A method according to claim 22 including printing said cards in accordance with a predetermined design that displays a trademark associated with the customer.

24. A method according to claim 22 including receiving a card order from the customer for a specified number of cards; initializing in the processor a number of new intermediary accounts equal to the number of cards ordered; and assigning unique account identifiers to each of the initialized accounts.

25. A method according to claim 24 wherein said producing the cards includes affixing to each card an indication of the corresponding intermediate account identifier by embossing or by electronic storage.

26. A method according to claim 1 wherein said collecting step is carried out in a batch mode on a daily basis.

27. A method according to claim 1 wherein said collecting step is effecting via the ACH automated clearing house system.

28. A method according to claim 1 and further comprising settling the payment transaction by transferring an amount of money equal to the payment amount, subject to adjustment, from the intermediary bank account into the vendor's bank account by electronic funds transfer.

29. A method according to claim 1 and further comprising providing a customer care interface between the payment processor and the vendor's customer service provider.

30. A method according to claim 29 wherein the customer care interface comprises a world-wide web browser interface.

31. A method according to claim 1 wherein validating the payment transaction data includes communicating with the vendor to confirm that the end-user's associated account number is valid.

32. A method according to claim 1 including, in the central processor, maintaining a database of intermediary payment accounts and a list of participating merchants.

33. A method according to claim 32 wherein the intermediary payment account database does not include personal identification of the end-user in order to protect the end-user's privacy.

* * * * *